J. T. BUEL.
MODE OF TAKING FISH.
No. 8,853. Patented Apr. 6, 1852.
*Fish Hook,*
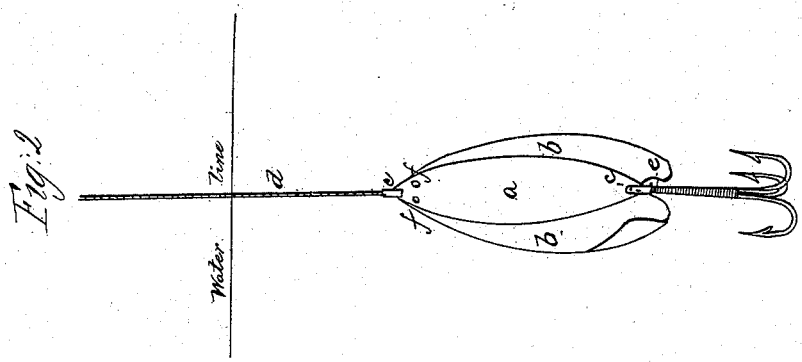
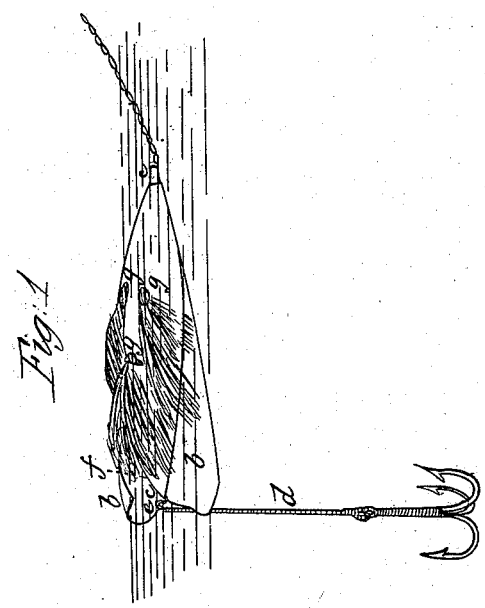

UNITED STATES PATENT OFFICE.

JULIO T. BUEL, OF WHITEHALL, NEW YORK.

IMPROVEMENT IN SPINNING BAIT FOR CATCHING FISH.

Specification forming part of Letters Patent No. 8,853, dated April 6, 1852.

*To all whom it may concern:*

Be it known that I, JULIO T. BUEL, of Whitehall, in the county of Washington and State of New York, have invented a new and useful Contrivance for Capturing Fish; and I do hereby declare that the following is a full, clear, and exact description thereof, reference being had to the accompanying drawings and letters marked thereon, forming a part of this specification.

The nature of my invention consists in an improved manner of constructing an artificial bait resembling a live fish or fly while in motion in the water of metal or other suitable material, said bait being hollow, forming an air-chamber, which is provided with an aperture for the admission of air or water, so that it can be made to float on the surface of the water for catching certain kinds of fish by closing the aperture, and it can be made to sink to any desired depth by opening the aperture and allowing water to take the place of air, and also so arranging said bait that it shall slide and twirl without twisting the line and recede from the fish when the bait is seized, said bait being formed of double fins of spiral shape, like the paddles of a screw-propeller, whereby it can be made to revolve at pleasure by rowing the boat to which its line is attached, by the action of the current, or by the sportsman walking on the shore and trailing it along with him.

In the accompanying drawings, Figure 1 represents my improved bait with the air-chamber closed and floating near or on the surface of the water; Fig. 2, the same with the aperture open, and the weight of the water, which has taken the place of air, has depressed it below the surface of the water.

The oval or round part *a*, forming the air-chamber, I swage or die up and solder onto a flat piece of metal, *b*, cut to about the shape represented, and turn up the ends of the flat piece of metal so as to form the double fins or propeller. I insert a small tube through it, so that the ends will project, as at *c c*, through which the line *d* passes, and the line, which is cord, wire, or gimp, is provided with a washer, *e*, against which the bait rests. The aperture or apertures *f f* are provided with stoppers, which can be removed or inserted at pleasure. *g g*, air-tight tubes for receiving feathers.

The bait is connected with the line by the line passing through a tube extending its whole length, so that it can twirl without twisting the line while resting against a washer, so that it shall slide and twirl thereon freely without twisting the line.

When fishing light, or with the bait floating near or on the surface of the water, I propose to use different colored baits with different colored feathers inserted in them. These variations in color of baits and feathers I deem it unnecessary to give special directions here, as any sportsman will understand the object and manner of adapting them to the season of the year and to the description of fish he is in pursuit of.

Having thus described my improved revolving fish or fly, I wish it to be distinctly understood that I do not claim what is called a "spoon," "minnow," or the common "fly," all these having been used before. I do not claim passing the line loosely through a cork or float that the float may move freely upon the line. Neither do I claim attaching a spinning bait to the line by means of a swivel; but

What I do claim as new, and desire to secure by Letters Patent, is—

1. Constructing a bait with an air-tight chamber, which chamber is provided with an aperture or apertures for the admission of air when fishing light near or on the surface of the water and for the admission of water when it is desired to fish deep under the surface of the water, substantially as described.

2. Passing the line through a tube in the body of a spinning bait in manner substantially as described, to enable the bait to twirl freely without twisting the line.

In testimony whereof I have hereunto signed my name before two subscribing witnesses.

JULIO T. BUEL.

Witnesses:
 JNO. D. A. HARRINGTON,
 DENNIS JONES.